(12) United States Patent
Chen et al.

(10) Patent No.: US 11,224,169 B2
(45) Date of Patent: Jan. 18, 2022

(54) ROTARY SHOE CLEANER

(71) Applicant: Deere & Company, Moline, IL (US)

(72) Inventors: Mingyong Chen, East Moline, IL (US); Tyler S. Brammeier, Okawville, IL (US); Michael T. Meschke, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 158 days.

(21) Appl. No.: 16/581,936

(22) Filed: Sep. 25, 2019

(65) Prior Publication Data
US 2021/0084823 A1    Mar. 25, 2021

(51) Int. Cl.
*A01F 12/44* (2006.01)
*A01F 7/06* (2006.01)
*A01F 12/26* (2006.01)

(52) U.S. Cl.
CPC ............ *A01F 12/442* (2013.01); *A01F 7/062* (2013.01); *A01F 12/444* (2013.01); *A01F 7/06* (2013.01); *A01F 7/067* (2013.01); *A01F 12/26* (2013.01)

(58) Field of Classification Search
CPC ...... A01F 12/442; A01F 7/062; A01F 12/444; A01F 7/06; A01F 7/067; A01F 12/26; A01D 41/1235
See application file for complete search history.

(56) References Cited

U.S. PATENT DOCUMENTS

| | | | | |
|---|---|---|---|---|
| 752,182 | A | * | 2/1904 | Ross .......................... A01F 7/06 460/66 |
| 1,907,344 | A | * | 5/1933 | Climer .................... A01F 12/00 209/295 |
| 2,129,452 | A | | 9/1938 | Van Sickle |
| 2,216,914 | A | | 10/1940 | Holtzman |
| 2,927,694 | A | * | 3/1960 | Scranton ............... A01F 12/442 209/283 |

(Continued)

FOREIGN PATENT DOCUMENTS

| | | |
|---|---|---|
| CN | 108093827 A | 6/2018 |
| EP | 1235478 B1 | 5/2003 |
| EP | 1220599 B1 | 11/2004 |

OTHER PUBLICATIONS

Bratney Companies, Cimbria DS 1250 Drum Scalper, 3 pages.

(Continued)

*Primary Examiner* — Arpad Fabian-Kovacs
(74) *Attorney, Agent, or Firm* — Taft Stettinius & Hollister LLP; Stephen F. Rost (57) ABSTRACT

A rotary cleaning system for a combine harvester that includes a hollow drum having a plurality of apertures along at least a portion of a length of an exterior surface of the drum, the drum having a feeding end configured to receive a harvested crop and a discharge end configured to expel chaff from the harvested crop and a guiding vane positioned in an interior of the drum, wherein one of the drum and the guiding vane is configured for rotation while the other one of the drum and the guiding vane is stationary to expel grain through the plurality of apertures in the drum. A feeding mechanism can be attached to supply the crop to the hollow drum. A fan can be attached to the rotary cleaning system to generate an air flow stream. A plurality of fingers can be positioned in the drum.

19 Claims, 7 Drawing Sheets

(56) References Cited

U.S. PATENT DOCUMENTS

| | | | | |
|---|---|---|---|---|
| 3,406,505 A | * | 10/1968 | Hanson | A01D 41/02 56/12.8 |
| 3,703,802 A | * | 11/1972 | Wrestler | A01F 12/442 56/13.3 |
| 3,794,166 A | | 2/1974 | Converse et al. | |
| 4,115,257 A | | 9/1978 | Mugler | |
| 4,178,942 A | * | 12/1979 | Nusser | A01F 12/442 460/80 |
| 4,198,802 A | * | 4/1980 | Hengen | A01F 12/442 56/14.6 |
| 4,250,897 A | | 2/1981 | Glaser | |
| 4,253,471 A | | 3/1981 | Klimmer | |
| 4,274,426 A | * | 6/1981 | Williams | A01F 7/062 460/67 |
| 4,284,086 A | * | 8/1981 | Williams | A01F 12/18 460/150 |
| 4,464,887 A | * | 8/1984 | Decoene | B07B 9/00 209/287 |
| 4,465,080 A | | 8/1984 | De Coene | |
| 4,465,081 A | | 8/1984 | Decoene et al. | |
| 4,535,787 A | * | 8/1985 | Underwood | A01F 7/06 460/101 |
| 4,541,441 A | * | 9/1985 | Ichikawa | A01F 12/442 460/66 |
| 4,700,718 A | * | 10/1987 | Rissanen | A01F 7/062 460/61 |
| 4,875,891 A | * | 10/1989 | Turner | A01F 12/24 460/110 |
| 4,957,467 A | * | 9/1990 | Zachary | A01F 12/442 460/69 |
| 5,045,025 A | * | 9/1991 | Underwood | A01F 7/06 460/66 |
| 5,344,367 A | * | 9/1994 | Gerber | A01F 12/10 460/68 |
| 5,445,563 A | * | 8/1995 | Stickler | A01F 7/06 460/69 |
| 5,688,170 A | * | 11/1997 | Pfeiffer | A01F 7/06 460/69 |
| 5,803,807 A | * | 9/1998 | Satzler | A01F 7/062 460/119 |
| 5,885,155 A | * | 3/1999 | Dwyer | A01F 12/18 460/72 |
| 6,257,977 B1 | * | 7/2001 | Moriarty | A01F 7/06 460/68 |
| 6,458,030 B2 | | 10/2002 | Visagie | |
| 6,468,152 B2 | * | 10/2002 | Moriarty | A01F 7/06 460/67 |
| 6,558,252 B2 | * | 5/2003 | Visagie | A01F 12/444 460/100 |
| 8,636,568 B1 | * | 1/2014 | Farley | A01F 7/067 460/68 |
| 2008/0207287 A1 | * | 8/2008 | McKee | A01F 7/067 460/69 |
| 2015/0065212 A1 | * | 3/2015 | Kvist | A01F 7/70 460/61 |
| 2019/0069487 A1 | | 3/2019 | Schwarz | |

OTHER PUBLICATIONS https://www.youtube.com/watch?v=AfNXDArqilE.

Wan et al., Design and Evaluation of Cyclone Separation Cleaning Devices Using a Conical Sieve for Rape Combine Harvesters, Applied Engineering in Agriculture, 2018, 10 pages, vol. No. 34—Issue No. 4, copyright 2018 American Society of Agricultural and Biological Engineers.

Park, Vertical Rotating Screens for Separating Seeds from Trashy Materials, Transactions of the ASAE, 1974, 6 pages.

Kutzbach et al., Equipment for grain separation in the combine harvester, Basics of agricultural engineering, 1981, 8 pages, vol. No. 31—Issue No. 6.

"Perforated Conveyor Belts", C.C. Components Pty. Ltd., https://cccomponents.com.au/perforated-conveyor-belts/, publicly available as early as Sep. 25, 2019.

* cited by examiner

ROTARY SHOE CLEANER

FIELD OF THE DISCLOSURE

The present disclosure relates to a combine harvester, and in particular, to a rotary cleaning system for separating chaff from grain or kernels.

BACKGROUND

Agricultural machines, such as a combine or harvester, include different portions or sections for moving crop therethrough. For example, a combine may include a cleaning shoe or system that is located between the wheels of the combine, behind the cab and below the engine. The cleaning system typically includes a large fan or blower that provides air driven upward therefrom. The cleaning system may include flat grating or grating in the form of a large cylindrical or semi-circular body through which grain and other residue falls through and onto a cleaning shoe (or sieve). Air from the fan or blower is generated upward through the flat grating and cleaning shoe and lifts material other than grain ("MOG") such as straw and carries the material to the rear of the combine on a flow of air. Grain that falls through a large flat screen of the cleaning system may collect near a bottom of the combine where it is lifted up by auger and elevator and deposited into a grain tank. The MOG is further carried by the air flow over the top of the sieve and to the rear of the combine where it is deposited onto the underlying ground. In effect, this performs the cleaning function of the combine. The MOG, which is carried by the air flow to the rear of the combine, may be spread on the ground or otherwise deposited on the ground in a narrow windrow or swath where it is later picked up.

Some combines further include a straw chopper or chopper assembly located between the sieve and the rear outlet of the combine. The chopper assembly may be formed by a large cylinder with blades or knives protruding therefrom, thereby forming a chopper rotor. The chopper assembly rotates and shreds or chops the residue or MOG before it exits the combine.

Most combine harvester designs use rotary threshing and separation units to harvest grain. To thresh grain, the grain must be separated from ears, pods, or the like. After the grain is separated from ears or pods, the grain must be separated from the chaff, debris, and similar material. A fan or blower is used to do this whereby the fan produces an air flow stream that carries away or separates the chaff from the grain. The chaff is typically lighter weight than the grain. Under difficult harvesting conditions, reciprocal cleaning systems have been used in combination with the fan or blower. These reciprocal cleaning systems typically include a belt or auger or step pan positioned under a threshing zone to capture any grain and carry the grain to the cleaning section of the system.

As can be appreciated, the harvesters that include reciprocal cleaning systems are used in fields that have a flat terrain or a hill terrain in which the harvester operates on an incline or at an angle. When the harvester is operating on an incline or in a side-hill field condition, the grain typically does not distribute evenly within the cleaning system such that the cleaning system becomes clogged which can potentially lead to grain cleanliness issues. Moreover, the cleaning system can fail due to the wear by the uneven crop distribution. Thus, there is a need for a cleaning system that replaces reciprocally moving parts in the cleaning system of the combine.

SUMMARY

In one embodiment of the present disclosure, a rotary cleaning system for a combine harvester, the rotary cleaning system comprising: a hollow drum having a plurality of apertures along at least a portion of a length of an exterior surface of the drum, the drum having a feeding end configured to receive a harvested crop and a discharge end configured to expel chaff from the harvested crop; and a guiding vane positioned in an interior of the drum, wherein one of the drum and the guiding vane is configured for rotation while the other one of the drum and the guiding vane is stationary to move chaff to the discharge end and expel grain through the plurality of apertures in the drum.

In one example of this embodiment, the drum is configured for rotation and the guiding vane is stationary.

In a second example of this embodiment, the guiding vane is configured for rotation and the drum is stationary.

In another example of this embodiment, the guiding vane is a spiral shape that extends along the length of the drum. In a further embodiment, the guiding vane includes one or more discrete guiding vanes. In yet a further embodiment, a plurality of fingers positioned near an interior surface of the drum, wherein the plurality of fingers are configured to pass through the guiding vane. In yet a further embodiment, the plurality of fingers are attached to the drum, the drum and the plurality of fingers are configured to rotate together. In another refinement of this embodiment, the plurality of fingers are stationary and the drum is configured to rotate about the plurality of fingers.

In yet another example of this embodiment, the plurality of apertures vary in size or spacing from one another along the length of the drum.

In another example of this embodiment, further includes a fan or blower configured to generate an air flow stream through the drum to expel the grain through the plurality of apertures and the chaff through the discharge end.

In yet another example of this embodiment, the guiding vane has a vane height that is adjustable relative to a type of the crop or a crop flow rate through the feeding end.

In an example of this embodiment, the guiding vane has a vane pitch that is adjustable relative to a type of the crop or a crop flow rate through the feeding end.

In another refinement of this embodiment, both of the drum and the guiding vane have an orientation relative to a ground surface that is adjustable from parallel relative to the ground surface to an inclined angle relative to the ground surface.

In another example of this embodiment, further comprising a feed mechanism attached to the hollow drum, wherein the feed mechanism is configured to supply the harvested crop to the feeding end of the drum. In one refinement of this embodiment, the feed mechanism is an auger configured to push the harvested crop into the feeding end of the drum. In yet another refinement of this embodiment, the feed mechanism is one of a hopper, a belt, a chain conveyor or a step pan.

In another example of this embodiment, further comprising a plurality of fingers positioned on the guiding vane.

In yet another example of this embodiment, further comprising: a crop conveyor positioned under the drum for transporting the grain.

In another example of this embodiment, the guiding vane includes a first shape that extends along a first portion of the length of the drum, the guiding vane includes a second shape that extends along a second portion of the length of the drum, wherein the first shape is different from the second shape, the combination of the first and second portions being equal to or less than the length of the drum.

In yet another example of this embodiment, further comprising: a second hollow drum having a second plurality of apertures along at least a portion of a length of a surface of the second hollow drum, the second hollow drum having a second discharge end configured to expel chaff from the crop, the first hollow drum is positioned within the second hollow drum and the size of the first plurality of apertures of the first hollow drum is larger than the size of the second plurality of apertures of the second hollow drum, the second hollow drum configured to receive the crop that passes through the first plurality of apertures of the first hollow drum to separate chaff from grain of the crop and expel chaff through the second discharge end; and a second guiding vane positioned in an interior of the second hollow drum, wherein one of the second drum and the second guiding vane is configured for rotation while the other one of the second drum and the second guiding vane is stationary to move chaff to the second discharge end and expel grain through the second plurality of apertures of the second hollow drum.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

The present disclosure includes a rotary cleaning system for a combine harvester that replaces reciprocally moving parts with rotationally moving parts which beneficially results in less failure in the cleaning system parts, resolves grain cleanliness issue in a side-hill field operating condition, is more efficient, and consumes less power. The present disclosure includes a rotary cleaning system for a combine harvester that is more durable because it eliminates reciprocal motions, both acceleration and deceleration. The rotary cleaning system disclosed herein has better separation of MOG from grain with a rotating agitator and optional blower or fan, and the rotary cleaning system has more uniform air flow across a cylindrical chamber or interior of the drum. If a fan or blower is assembled with the rotary cleaning system, then the rotary cleaning system is more efficient in fan performance by confining air flow in the cylindrical chamber of the drum and does not have to fight through thick crop matt on a chaffer or sieve as in conventional cleaning systems. The rotary cleaning system has a consistent performance whether the combine harvester is operating on a flat ground surface or on a side-hill field.

Figure 1:
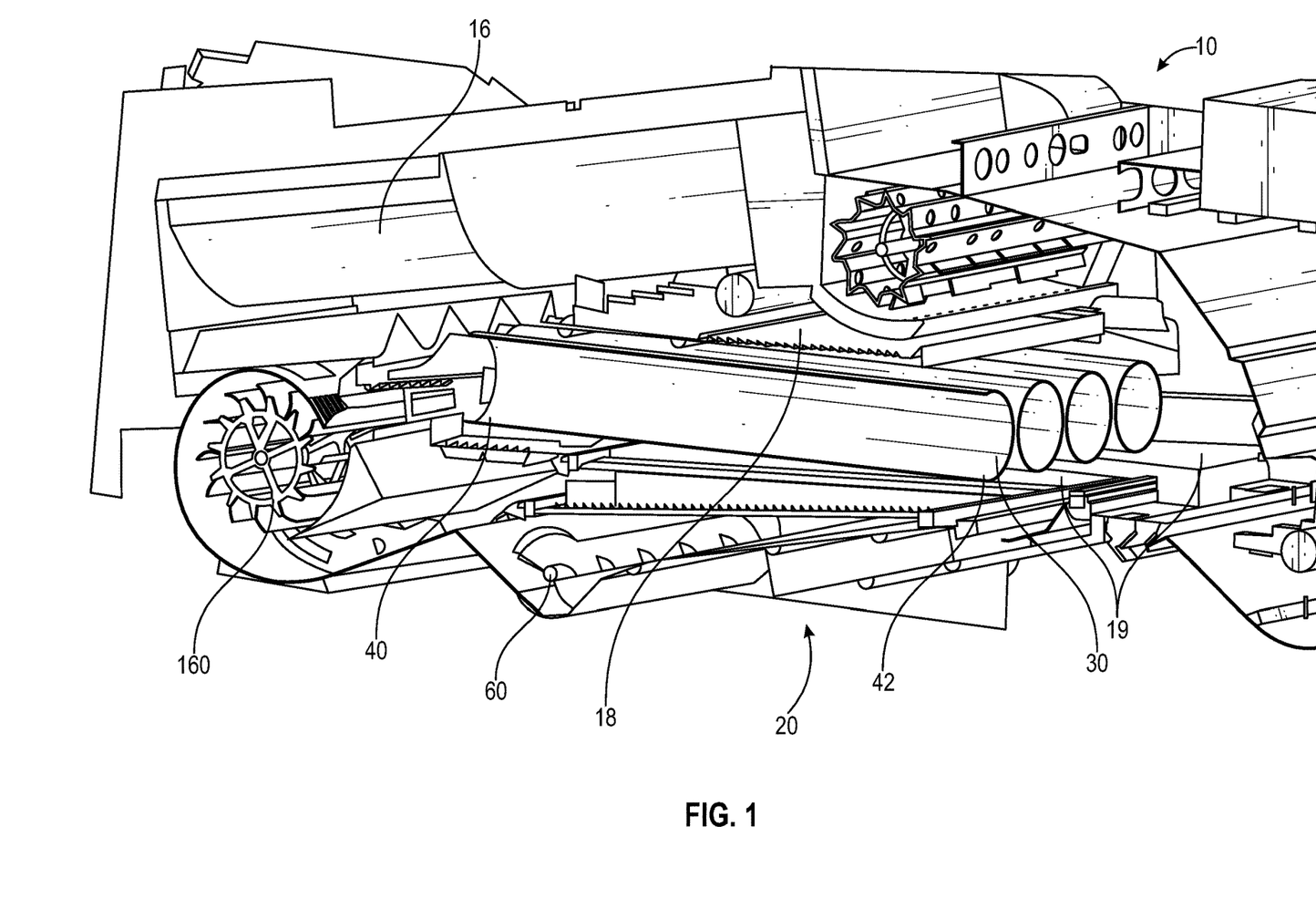
FIG. 1 is a side view with a partial cross-section of a rotary cleaning system for a combine.

In FIG. 1, an embodiment of a crop processing arrangement 10 for an agricultural combine (not illustrated) is shown. The crop processing arrangement 10 can be used with any type of agricultural combine. As can be appreciated, the agricultural combine includes wheels that are coupled to a chassis (not illustrated) and are used for a forward propulsion of the combine in a forward operating or travelling direction. The forward operating direction is to the left in FIG. 1. The operation of the combine is controlled from an operator's cab (not illustrated). The operator's cab may include any number of controls (not shown) for controlling the operation of the combine. A cutter head (not illustrated) is disposed at a forward end of the combine and is used in order to harvest crop such as corn or wheat and to conduct or load it by a crop loading or feed mechanism 16 to a rotary cleaning system 20 for crop separation as described below.

The rotary cleaning system 20 may include one or more hollow drums or housings 30 and a corresponding guiding vane 32 (FIG. 2) arranged in each of the hollow drums 30 which can take many forms as described below. The hollow drum 30 has an exterior surface 34 and an interior surface that defines an interior of the hollow drum 30 sized to receive the guiding vane 32 therein. The rotary cleaning system 20 includes a cover 18 for each of the hollow drums 30 that is sized and configured to enclose a top portion of each of the hollow drums 30 to thereby block separated grain from expelling upwards into the harvester and potentially clogging other parts of the harvester. The cover 18 is a shroud or section of sheet material that wraps around the top portion of the hollow drums 30. In one embodiment, the cover 18 is a sheet having a semi-circular cross sectional shape to enclose the hollow drum 30. In another embodiment, the cover 18 is a flat plate that spans across the combined width and length of the plurality of hollow drums 30. The rotary cleaning system 20 also includes a plurality of elements (chaffer and sieve) 19 that span under the plurality of hollow drums 30. The plurality of elements 19 are arranged with a small gap between each of the elements 19 to allow the grain to fall through.

The hollow drum 30 may be a cylindrical shape or other shape such as a corrugated shape. The hollow drum 30 includes a plurality of apertures 38 that span through the exterior surface 34 and the interior surface. The hollow drum 30 has a longitudinal length L that spans between a feeding end 40 that is configured to receive a harvested crop from the crop loading mechanism 16 and a discharge end 42 that is configured to expel chaff from the harvested crop. The crop loading or feed mechanism 16 guides the harvested crop to the feeding end 40. The hollow drum 30 can be configured to rotate or be stationary. In the embodiment in which the hollow drum 30 is configured to rotate, the speed of rotation may be a constant speed or a variable speed. In one embodiment, the hollow drum 30 is configured to rotate while the guiding vane 32 is stationary. In another embodiment, the hollow drum 30 is stationary while the guiding vane 32 is configured to rotate. In yet another embodiment, the hollow drum 30 can rotate at a different speed than the guiding vane 32, i.e., faster or slower rotational speed than the guiding vane 32. The hollow drum 30 can be configured to operate at a parallel orientation relative to a chassis frame of the combine harvester or a ground surface, or operate at an inclined angle to the chassis frame of the combine harvester or the ground surface.

Figure 3:
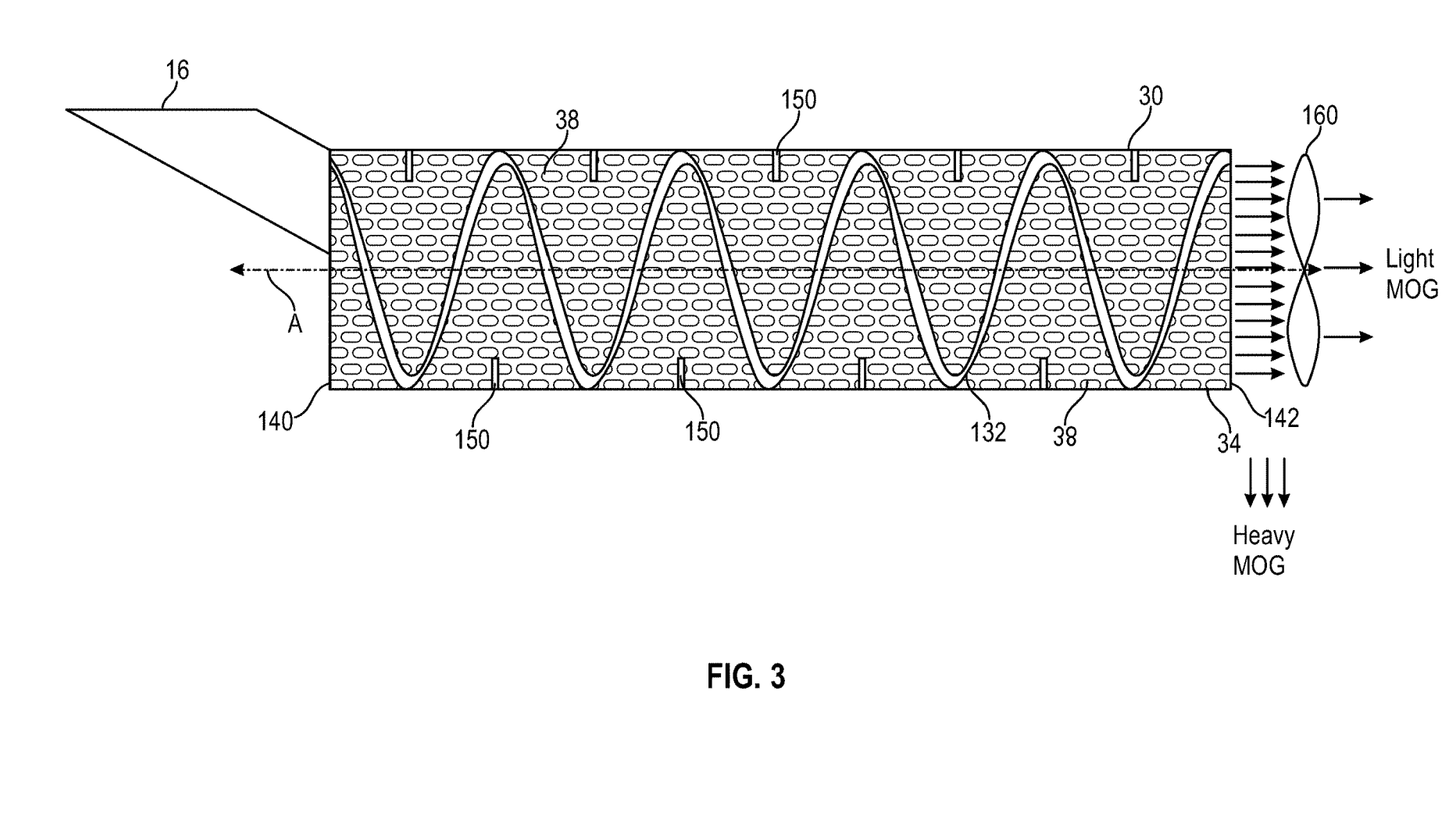
FIG. 3 is a side view of a second embodiment of a rotary cleaning system.

The plurality of apertures 38 of the hollow drum 30 can be the same size or shape, or vary in size or shape along the longitudinal length L of the hollow drum 30. For example, the plurality of apertures 38 can be circular, oval, to name a few shapes. In any embodiment, the plurality of apertures 38 are sized to allow grain to flow or pass through to thereby expel the grain to a crop conveyor positioned under the hollow drum 30 to transport the grain away from the rotary cleaning system 10. The plurality of apertures 38 can vary in number or density along the longitudinal length L of the hollow drum 30. In an alternative embodiment, the interior surface of the hollow drum 30 can include one or more agitating fingers 150 as illustrated in FIG. 3 wherein the one or more agitating fingers 150 are configured to pass through a guiding vane 132, as described in more detail below.

The guiding vane 32 can be continuous along the longitudinal length L of the hollow drum 30 or the guiding vane 32 can be discontinuous or include two or more discrete guiding vanes 32 within the longitudinal length L of the hollow drum 30. In the latter embodiment, the two or more discrete guiding vanes 32 can have the same length and/or shape or a different length and/or shape. For example, the guiding vane 32 can have a first shape that extends along a first portion of the longitudinal length L of the hollow drum 30, and the guiding vane 32 can have a second shape that extends along a second portion of the longitudinal length L of the hollow drum 30, wherein the first shape is different from the second shape, and the combination of the first and second portions are equal or less than the longitudinal length L of the hollow drum 30. Moreover, each of the hollow drums 30 can have a unique guiding vane. The guiding vane 32 can rotate or be stationary relative to the hollow drum 30. In the embodiment in which the guiding vane 32 rotates, the guiding vane 32 may rotate at a constant speed or a variable speed. Moreover the guiding vane 32 may rotate at a different speed than the hollow drum 30.

Figure 2:
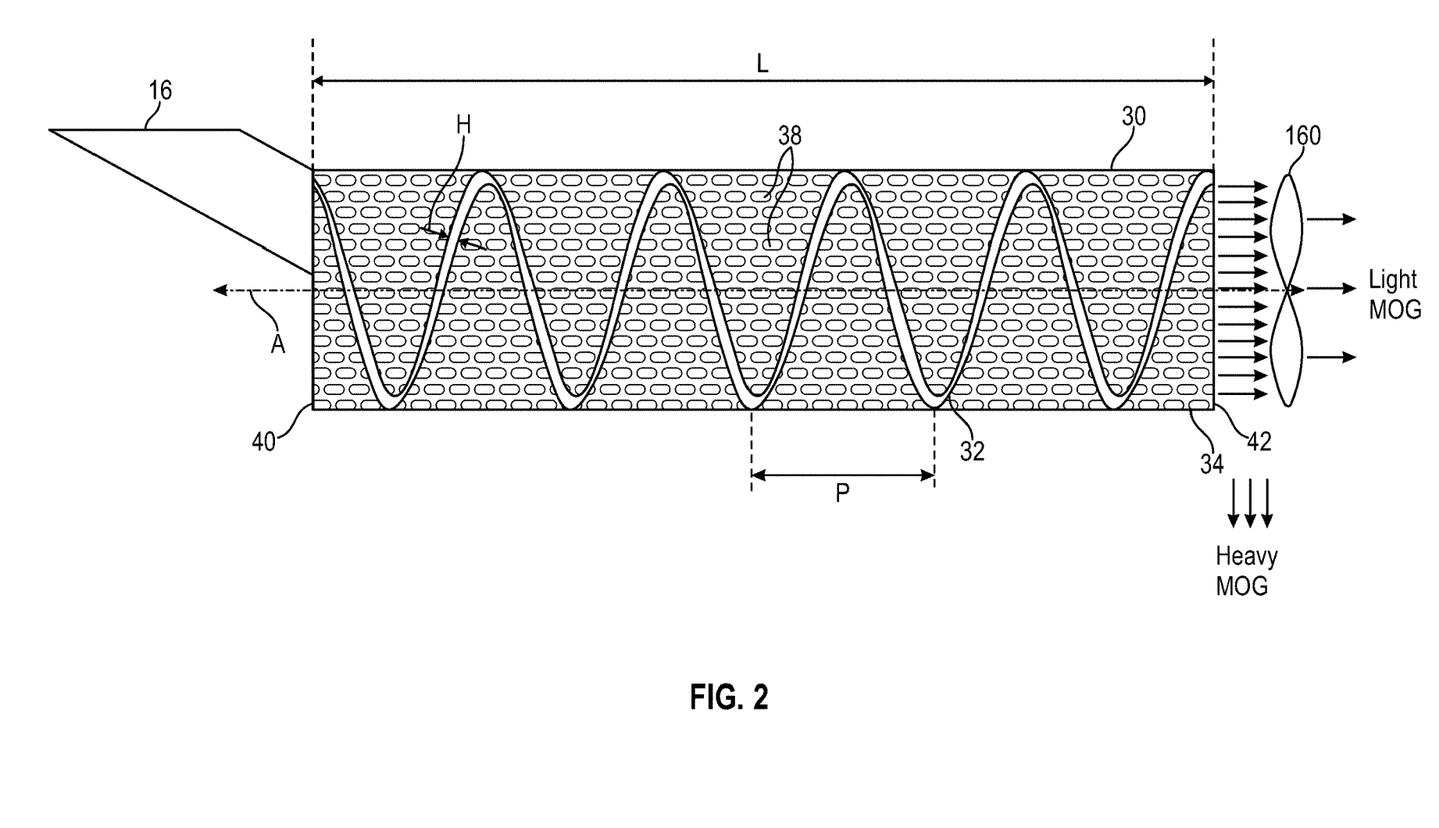
FIG. 2 is a side view of a first embodiment of a rotary cleaning system.

As illustrated in FIG. 2, the guiding vane 32 has an elongated spiral or helix shape that spans the longitudinal length L of the hollow drum 30. The guiding vane 32 has a vane height H and a vane pitch P as illustrated in FIG. 2. The vane height H is measured across the guiding vane 32 wherein the vane height H can vary or be constant along the longitudinal length L of the guiding vane 32. The vane pitch P is measured horizontally from peak to peak of the guiding vane 32. The vane height H and/or the vane pitch P can vary along the longitudinal length L of the guiding vane 32. The vane height H and/or the vane pitch P can be adjusted relative to a type of the crop or a crop flow rate through the feeding end 40 of the hollow drum 30.

Figure 4:
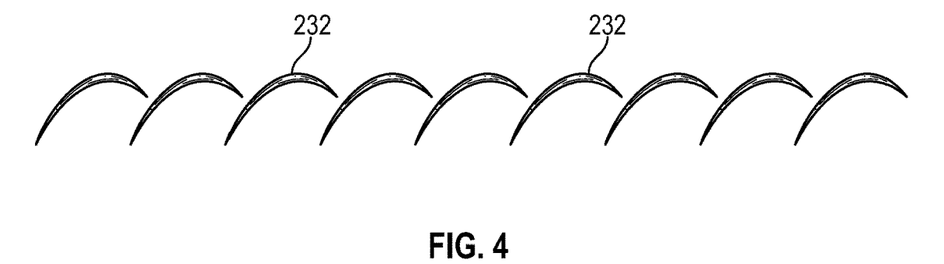
FIG. 4 is a first embodiment of a guiding vane of a rotary cleaning system.

Illustrated in FIG. 4, is another embodiment of a guiding vane 232 that can be assembled with the hollow drum 30 and is similar to guiding vane 32 unless noted otherwise. The guiding vane 232 includes a plurality of discrete spiral vanes that can be positioned along the longitudinal length L of the hollow drum 30 such as evenly distributed or varying in distribution.

Figure 5:
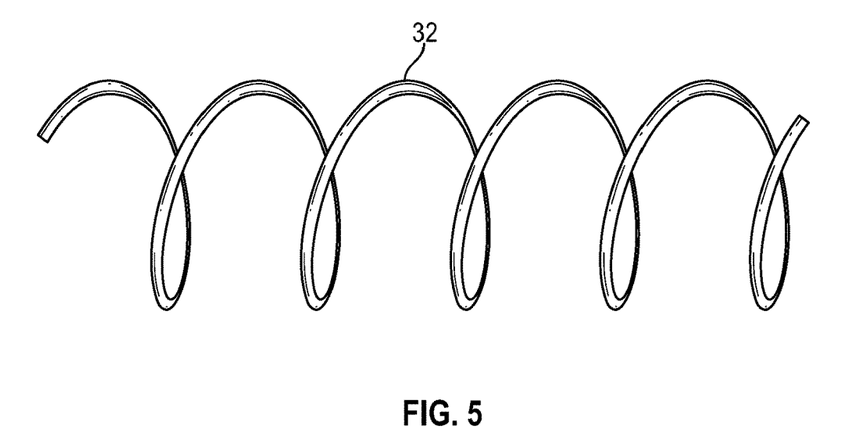
FIG. 5 is a second embodiment of a guiding vane of a rotary cleaning system.

Illustrated in FIG. 5, is the embodiment of the guiding vane 32 that includes a continuous spiral vane that can be assembled with the hollow drum 30.

Figure 6:
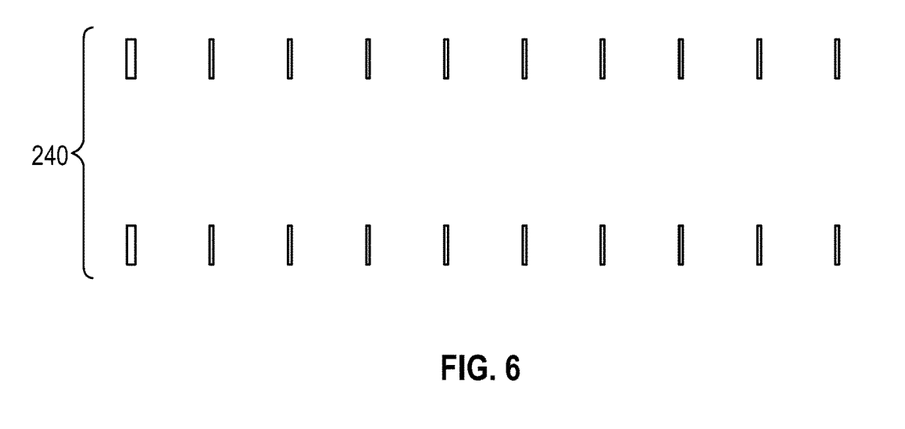
FIG. 6 is a first embodiment of fingers that can be assembled onto any of the guiding vanes disclosed herein.
Figure 7:
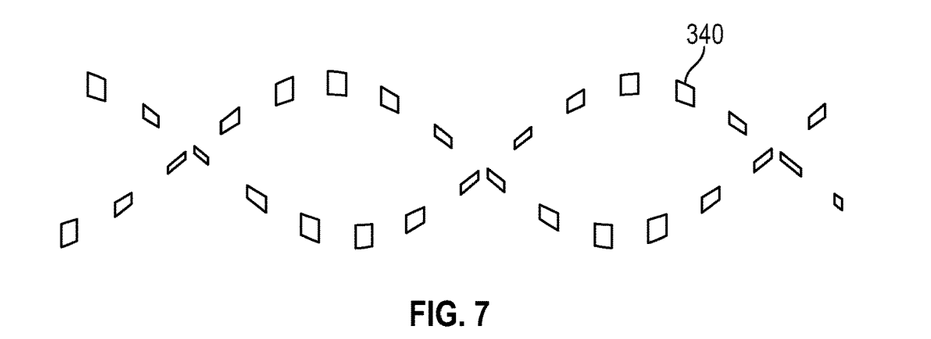
FIG. 7 is a second embodiment of fingers that can be assembled onto any of the guiding vanes disclosed herein.

Illustrated in FIG. 6, is a plurality of fingers 240 that can be assembled onto any of the guiding vanes 32, 132, 232 or other shape of guiding vanes. The plurality of fingers 240 have a length to extend away from the guiding vane 32 but are configured to avoid direct contact with the interior surface of the hollow drum 30. The plurality of fingers 240 are relatively flat. The plurality of fingers 240 can be evenly distributed, grouped, or discretely positioned along the length of the guiding vanes 32, 132, 232. Illustrated in FIG. 7, is a plurality of fingers 340 that are similar in all aspects to the plurality of fingers 240 except the shape of the fingers 340 is spiral wherein the length of each of the plurality of fingers 240 varies such that some of the fingers 340 are longer than other of the fingers 340.

Figure 8:
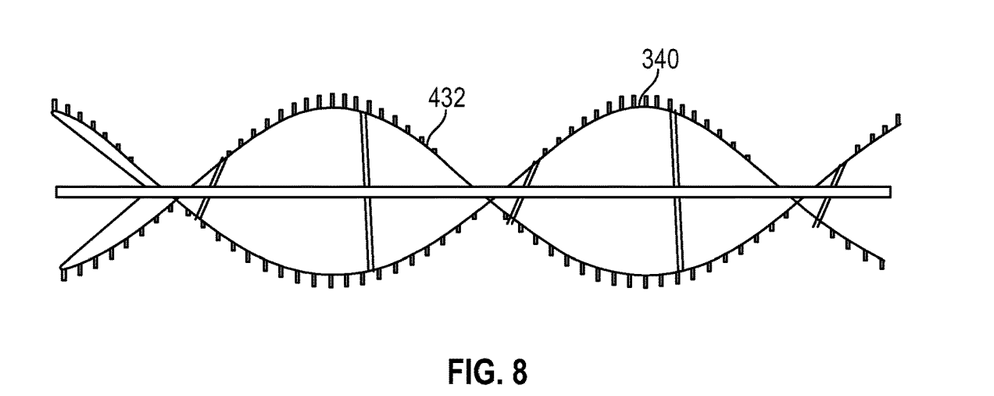
FIG. 8 is a third embodiment of a guiding vane of a rotary cleaning system.

Illustrated in FIG. 8, is a guiding vane 432 that can be assembled with the hollow drum 30 and is similar to guiding vane 32 unless noted otherwise. The guiding vane 432 has an elongated spiral shape with the plurality of fingers 340 positioned thereon. As can be appreciated, the plurality of fingers 240 can be assembled with the guiding vane 432 instead of the fingers 340.

Figure 9:
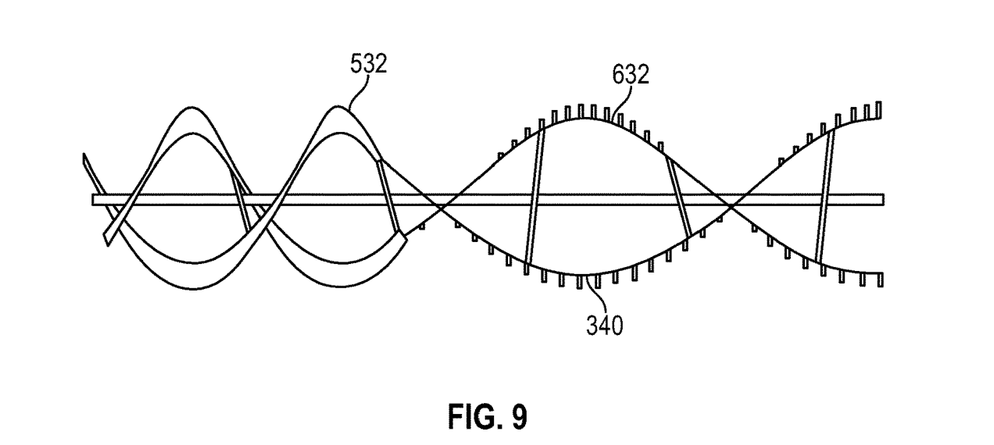
FIG. 9 is a fourth embodiment of a guiding vane of a rotary cleaning system.
Figure 10:
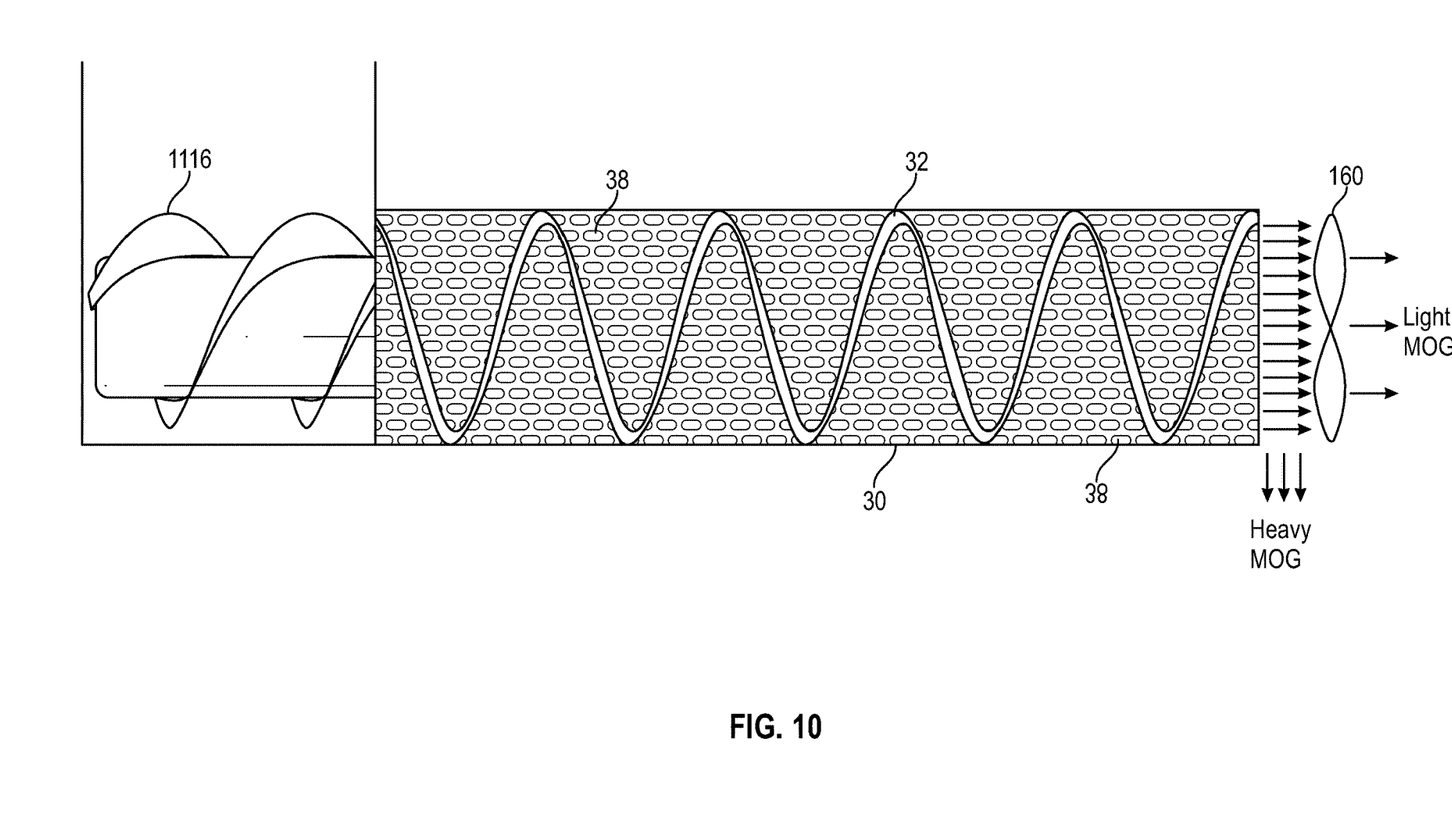
FIG. 10 is a side view of a third embodiment of a rotary cleaning system.

Illustrated in FIG. 9, is a first spiral guiding vane 532 attached to a second spiral guiding vane 632 that are assembled with the hollow drum 30 and are similar to the guiding vane 32 unless noted otherwise. The first spiral guiding vane 532 has a first spiral shape and the second spiral guiding vane 632 has a second spiral shape that is different than the first spiral shape. The second spiral guiding vane 632 includes the plurality of spiral fingers 340. As can be appreciated, the plurality of fingers 240 can be assembled with the guiding vane 32 instead of the fingers 340.

Returning to FIG. 3, the one or more agitating fingers 150 are positioned near the interior surface of the hollow drum 30. The one or more agitating fingers 150 are configured to avoid contact with the guiding vane 132 positioned within the hollow drum 30 and as such are configured to pass through the guiding vane 132 so cuts to vane 132 need to be made where fingers 150 pass through vane 132. In one embodiment, the one or more agitating fingers 150 are attached to the interior surface of the hollow drum 30 and are configured to rotate with the hollow drum 30. In another embodiment, the one or more agitating fingers 150 are stationary but the hollow drum 30 is configured to rotate. The one or more agitating fingers 150 can be similar to the plurality of fingers 240 or 340.

Turning now to FIGS. 1, 2, and 3, the rotary cleaning system 10 also includes a fan or blower 160 configured to generate an air flow stream through the hollow drum 30 to expel the grain through the plurality of apertures 38 and the chaff through the discharge end 42. The fan or blower 160 produces an air flow that carries the light MOG and chaff through the discharge end 42 and out the rear of the combine. The fan or blower 160 is capable of providing a suction or pusher air path inside the hollow drum 30 depending on the arrangement relative to the hollow drum 30. For example, the fan or blower 160 can be positioned at the feeding end 40 and create a pusher air path to push the chaff out the discharge end 42. Alternatively, the fan or blower 160 can be positioned at the discharge end 42 and create a suction type air path to pull the chaff out the discharge end 42.

Figure 11:
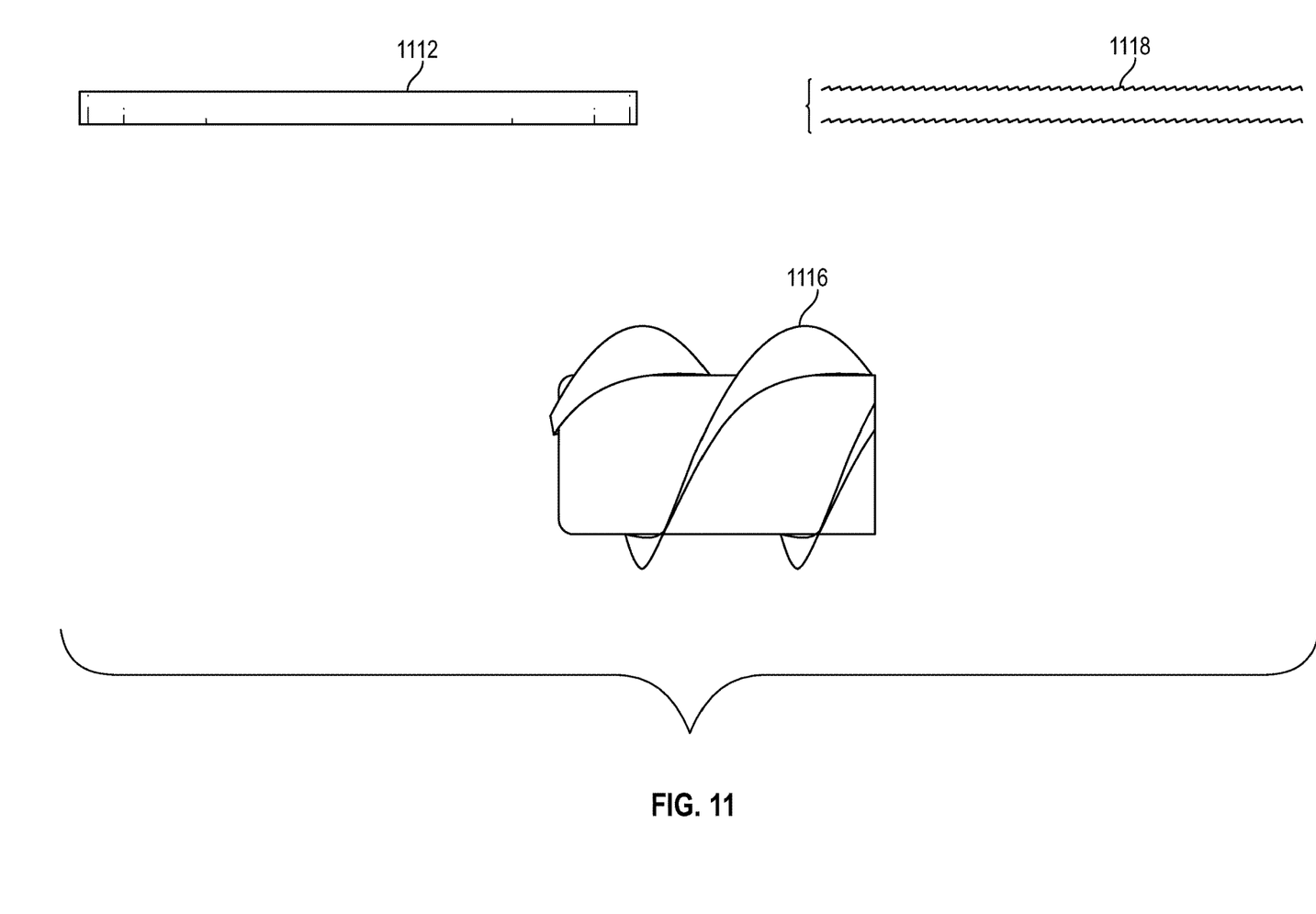
FIG. 11 illustrates some other crop loading or feed mechanisms, besides hopper, that can be assembled with the rotary cleaning system.

Illustrated in FIGS. 1, 2, and 3, the crop loading or feed mechanism 16 is a hopper which is one example of a top loading form of feeding the harvested crop into the feeding end 40 of the hollow drum 30. Other types of crop loading or feed mechanisms 16 that can be used with the rotary cleaning system 10 are side loading or conveyor loading. Illustrated in FIG. 11 are embodiments of conveyor loading that can include a slope conveyor or a conveyor belt 1112, a step pan 1118, and an auger 1116. The step pan 1118 has a reciprocal motion. The step pan 1118 may or may not have holes on its surface.

In use, the harvested crop is supplied by the feeding mechanism 16 to the rotary cleaning system 20, and specifically to each of the feeding ends 40 of the plurality of hollow drums 30. In the embodiment in which the fan or blower 160 is assembled with the rotary cleaning system 20, the fan or blower 160 assists the feeding mechanism 16 to push or pull the harvested crop into the hollow drums 30. In other embodiments, the fan or blower 160 is not assembled with the rotary cleaning system 20. Either the hollow drum 30 or the guiding vane 32 rotates while the harvested crop moves from left to right in FIG. 2 to separate the grain from the harvested crop, and to separate the harvested crop into heavy MOG and grain. The grain is expelled or pushed through the plurality of apertures 38 while either the hollow drum 30 or the guiding vane 32 rotates. The grain falls onto a screw conveyor 60 that transports the clean grain to a holding tank configured to store the clean grain. The MOG or harvested crop residue that consists essentially of chaff and small straw particles is delivered through the discharge end 42 of the hollow drums 30 and through the fan or blower 160 may be delivered to a chopper rotor assembly as is commonly known.

In an alternative embodiment, the rotary cleaning system 20 includes two stages of cleaning. The rotary cleaning system 20 includes two hollow drums 30 arranged such that a first one of the hollow drums 30 has a smaller outer diameter than an interior diameter of a second one of the hollow drums 30. The first one of the hollow drums 30 includes one of the guiding vanes 32 arranged therein. The second one of the hollow drums 30 includes a second one of the guiding vanes 32 arranged therein. It should be appreciated the first one of the hollow drums 30 with the first one of the guiding vanes 32 therein, is arranged within the second one of the hollow drums 30 and the second one of the guiding vanes 32. The second hollow drum receives the crop (mainly grain plus a little remaining chaff) that passed through the first plurality of apertures of the first hollow drum in order to further separate chaff from grain. The first hollow drum 30 having a first feeding end is configured to receive the harvested crop and a first discharge end configured to expel most of the chaff from the harvested crop. The second hollow drum 30 has a second plurality of apertures along at least a portion of a length of a surface of the second hollow drum 30, wherein the size of the second plurality of apertures is smaller than the size of the first plurality of apertures of the first hollow drum 30.

Moreover, during operation of the first and second hollow drums 30 and first and second guiding vanes 32, a first stage of cleaning occurs with the first vane 32 being positioned in the first hollow drum 30 such that bigger particles and MOG pass through the larger first plurality of apertures. A second stage of cleaning occurs with the MOG that has passed through the first plurality of apertures with the second guiding vane 32 in the second hollow drum 30.

Similar to the first guiding vane 32 and the first hollow drum 30, one of the second hollow drum 30 and the second guiding vane 32 is configured for rotation while the other one of the second drum 30 and the second guiding vane 32 is stationary to move chaff to the second discharge end and expel grain through the second plurality of apertures in the second hollow drum 30.

Any of the guiding vanes, hollow drums, and feeding mechanisms may be combined to form the rotary cleaning system. Moreover, the fan or blower or fan may be a suction or push type of air flow through the hollow drums and may be added to the rotary cleaning system as desired.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A rotary cleaning system for a combine harvester, the rotary cleaning system comprising:
   a hollow drum having a plurality of apertures along at least a portion of a length of an exterior surface of the drum, the drum having a feeding end that receives a harvested crop and a discharge end through which chaff is expelled from the harvested crop;
   a hollow guiding vane positioned in an interior of the drum, the guiding vane includes an opening that receives the harvested crop therein, wherein one of the drum and the guiding vane is rotatable while the other one of the drum and the guiding vane is stationary to move chaff through the guiding vane to the discharge end and expel grain through the plurality of apertures in the drum; and
   a plurality of fingers positioned near an interior surface of the drum, wherein the plurality of fingers pass through the guiding vane when either the drum or the guiding vane rotates.

2. The rotary cleaning system of claim 1, wherein the drum is rotatable and the guiding vane is stationary.

3. The rotary cleaning system of claim 1, wherein the guiding vane is rotatable and the drum is stationary.

4. The rotary cleaning system of claim 1, wherein the guiding vane is a spiral shape that extends along the length of the interior of the hollow drum.

5. The rotary cleaning system of claim 4, wherein the guiding vane includes one or more discrete guiding vanes.

6. The rotary cleaning system of claim 1 wherein the plurality of fingers are attached to the drum, the drum and the plurality of fingers rotate together.

7. The rotary cleaning system of claim 1 wherein the plurality of fingers are stationary and the drum rotates about the plurality of fingers.

8. The rotary cleaning system of claim 1, wherein the plurality of apertures vary in size or spacing from one another along the length of the drum.

9. The rotary cleaning system of claim 1, further comprising:
   a fan or a blower that generates an air flow stream through the drum to expel the grain through the plurality of apertures and the chaff through the discharge end.

10. The rotary cleaning system of claim 1, wherein the guiding vane has a vane height that is adjustable relative to a type of the crop or a crop flow rate through the feeding end.

11. The rotary cleaning system of claim 1, wherein the guiding vane has a vane pitch that is adjustable relative to a type of the crop or a crop flow rate through the feeding end.

12. The rotary cleaning system of claim 1, wherein both of the drum and the guiding vane have an orientation relative to a ground surface that is adjustable from parallel relative to the ground surface to an inclined angle relative to the ground surface.

13. The rotary cleaning system of claim 1, further comprising:
   a feed mechanism attached to the hollow drum, wherein the feed mechanism supplies the harvested crop to the feeding end of the drum.

14. The rotary cleaning system of claim 13, wherein the feed mechanism is an auger that pushes the harvested crop into the feeding end of the drum.

15. The rotary cleaning system of claim 13, wherein the feed mechanism is one of a hopper, a belt, or a step pan.

16. The rotary cleaning system of claim 1, further comprising:
   a plurality of fingers positioned on the guiding vane.

17. The rotary cleaning system of claim 1, further comprising:
   a crop conveyor positioned under the drum for transporting the grain.

18. The rotary cleaning system of claim 1, wherein the guiding vane includes a first shape that extends along a first portion of the length of the drum, the guiding vane includes a second shape that extends along a second portion of the length of the drum, wherein the first shape is different from the second shape, the combination of the first and second portions being equal to or less than the length of the drum.

19. The rotary cleaning system of claim 1, further comprising:
   a second hollow drum having a second plurality of apertures along at least a portion of a length of a surface of the second hollow drum, the second hollow drum having a second discharge end that expels chaff from the crop, the first hollow drum is positioned within the second hollow drum and the size of the first plurality of apertures of the first hollow drum is larger than the size of the second plurality of apertures of the second hollow drum, the second hollow drum receives the crop that passes through the first plurality of apertures of the first hollow drum to separate chaff from grain of the crop and expel chaff through the second discharge end; and
   a second guiding vane positioned in an interior of the second hollow drum, wherein one of the second drum and the second guiding vane is rotatable while the other one of the second drum and the second guiding vane is stationary to move chaff to the second discharge end and expel grain through the second plurality of apertures of the second hollow drum.

* * * * *